United States Patent Office
3,079,393
Patented Feb. 26, 1963

3,079,393
THIAZOCINE COMPOUNDS
Harry Louis Yale, New Brunswick, and Francis Alexander Sowinski, Edison, N.J., assignors to Olin Mathieson Chemical Corporation, New York, N.Y., a corporation of Virginia
No Drawing. Filed Feb. 20, 1961, Ser. No. 90,238
9 Claims. (Cl. 260—268)

This invention relates to thiazocine compounds. More particularly, the invention relates to basically substituted thiazocines, their acid addition salts, processes for the preparation thereof and new intermediates useful in such processes.

The basically substituted thiazocines may be represented by the formula (I)
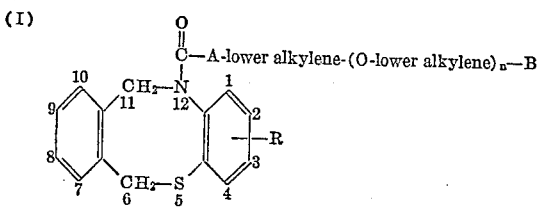

In the above formula and in those which follow, the various terms and symbols all have the same meaning. The symbol $n$ represents 0 or 1.

The lower alkylene groups in the formula are straight or branched chain aliphatic hydrocarbon groups such as methylene, ethylene, propylene, isopropylene, butylene, dimethylethylene and the like. The number of atoms in the —lower alkylene-(O-lower alkylene)$_n$— chain total 8 or less.

The symbol R represents hydrogen, any of the four halogens, preferably chlorine or bromine, trihalomethyl groups such as trifluoromethyl, straight and branched chain lower alkoxy groups such as methoxy, ethoxy, propoxy, isopropoxy, butoxy and the like, trihalomethylmercapto, like trifluoromethylmercapto and lower alkyl groups, such as methyl, ethyl, propyl, isopropyl, butyl, isobutyl, t-butyl, amyl and the like.

The symbol A represents O, NH or N-lower alkyl.

The symbol B represents a basic saturated nitrogen-containing radical of less than 12 carbon atoms. The nitrogen may bear only hydrogen atoms, e.g. an amino group, or the nitrogen may contain two lower alkyl or substituted lower alkyl groups to form, for example, a dialkylamino substituent, such as dimethylamino, diethylamino, a di(hydroxyalkyl)amino substituent such as di(hydroxyethyl)amino or the like. In addition, the nitrogen atom may form a saturated 5- or 6-membered N-heterocyclic radical of less than 12 carbon atoms in which case B represents, for example, piperidyl [i.e., piperidino, 2-piperidyl, 3-piperidyl and 4-piperidyl]; (lower alkyl)-piperidyl [e.g. 2-, 3-, or 4-(lower alkyl) piperidyl or 2-, 3-, or 4-(N-lower alkyl)piperidyl]; di(lower alkyl)piperidyl [e.g. 2,4-, 2,5-, or 3,5-di(lower alkyl)piperidyl or 2-, 3-, or 4-(N-lower alkyl)-2, 3-, or 4-(lower alkyl)piperidyl]; (lower alkoxy)piperidyl; pyrrolidyl; (lower alkyl)pyrrolidyl; di(lower alkyl)pyrrolidyl; (lower alkoxy)-pyrrolidyl; morpholinyl [i.e. morpholine, 2-morpholinyl and 3-morpholinyl]; (lower alkyl)morpholinyl; di(lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazinyl; (lower alkyl)piperazinyl (e.g. N$^4$-methylpiperazinyl); di(lower alkyl)piperazinyl; (lower alkoxy)piperazinyl; (hydroxy-lower alkyl)-piperazinyl [e.g. N$^4$-(2-hydroxyethyl)piperazinyl]; (lower alkanoyloxyalkyl)piperazinyl [e.g. N$^4$-(2-acetoxyethyl) piperazinyl; (hydroxy-lower alkoxy-lower alkyl)piperazinyl [e.g. N$^4$-(2-hydroxyethoxyethyl)piperazinyl]; and (carbo-lower alkoxy)piperazinyl [e.g. N$^4$-(2-carbomethoxy-, carboethoxy-, or carbopropoxy)piperazinyl].

The particularly preferred compounds are those wherein R represents chloro, trifluoromethyl, t-butyl, methoxy or trifluoromethylmercapto, and B represents dimethylamino, diethylamino or hydroxyethylpiperazinyl.

The compounds of Formula I may be produced by reacting a 11,12-dihydro-6H-dibenzo[b,f][1,4]thiazocine-12-carbonyl chloride of the formula (II)
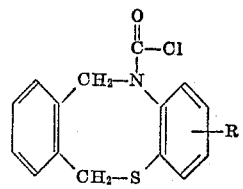

with an alkanol or alkamine having one of the following formulas (III)   HO-lower alkylene-(O-lower alkylene)$_n$-B
(IV)   NH$_2$-lower alkylene-(O-lower alkylene)$_n$-B
(V)    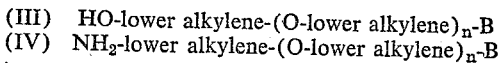

The reaction is effected in the presence of an alkaline condensing agent, e.g. an alkali metal hydride such as sodium hydride, lithium hydride or the like, in an inert organic solvent, preferably a hydrocarbon solvent such as benzene, toluene, xylene or the like.

Alternatively, a 11,12-dihydro-6H-dibenzo[b,f][1,4]-thiazocine may be reacted with an alkyl chlorocarbonate, e.g., ethyl chlorocarbonate, in benzene or toluene to give a compound of the Formula VI, (VI)
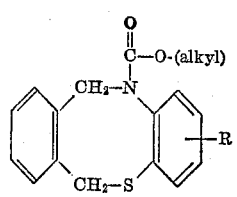

and this in turn is reacted with an alkanol or alkamine as previously defined, to give a compound of the Formula I, by alkanol exchange or alkaminolysis.

The 11,12-dihydro-6H-dibenzo[b,f][1,4]thiazocine-12-carbonyl chlorides of Formula II, which are used as starting materials are produced by reacting a 11,12-dihydro-6H-dibenzo[b,f][1,4]thiazocine with phosgene in an inert solvent like toluene.

The compounds of Formula I form acid addition salts by reaction with an equimolar proportion or excess of an inorganic or organic acid. Such salts include hydrohalides such as hydrochloride, hydrobromide, hydroiodide and the like, other mineral acid salts such as phosphate, sulfate, nitrate, etc., organic acid salts, such as oxalate, tartrate, malate, citrate, camphorsulfonate, benzenesulfonate, toluenesulfonate, salicylate, benzoate, ascorbate, mandelate, and the like.

The compounds of this invention are useful as antispasmodic agents or antihistamines. They may be administered orally or parenterally by incorporating the base or a pharmacologically acceptable acid addition salt thereof in a suitable carrier to form tablets, capsules, elixirs, injectables and the like according to conventional practice.

The following examples are illustrative of the invention. All temperatures are expressed in degrees centigrade.

EXAMPLE 1

11,12-Dihydro-6H-Dibenzo[b,f][1,4]Thiazocine

To a stirred solution of 57.5 g. of α,α'-dibromo-o-xylene in 175 ml. of dimethylformamide are added 26.5 g. of o-aminobenzenethiol in 100 ml. of glacial acetic acid. The mixture is heated at 85–90° for three hours, cooled, the crystalline 11,12-dihydro-6H-dibenzo[b,f]-[1,4]thiazocine hydrobromide filtered and stirred into 100 ml. of 20% aqueous sodium hydroxide and 250 ml. of ether. The ether solution is separated and concentrated to give 18.0 g. of 11,12-dihydro-6H-dibenzo[b,f][1,4]thiazocine, M.P. 104–106°.

11,12-Dihydro-6H-Dibenzo[b,f][1,4]Thiazocine-12-Carbonyl Chloride

To an ice-cooled solution of 17 g. of 11,12-dihydro-6H-dibenzo[b,f][1,4]thiazocine in 100 ml. of dry toluene is added slowly a solution of 15 g. of phosgene in 150 ml. of dry toluene. When the reaction is complete, the mixture is filtered and the filtrate concentrated to dryness in vacuo to give 11,12-dihydro-6H-dibenzo[b,f][1,4]-thiazocine-12-carbonyl chloride, M.P. 138–140°, after recrystallization from Skellysolve E.

2-(2-Piperidinoethoxy)Ethanol

A mixture of 34.0 g. of piperidine, 24.8 g. of diethylene chlorohydrin, 27.6 g. of potassium carbonate, 100 mg. of copper powder, 5 g. of sodium iodide and 50 ml. of toluene are stirred and refluxed for 24 hours. The cooled reaction mixture is washed with water, filtered, extracted with dilute hydrochloric acid, the hydrochloric acid extract is gradually treated with an excess of sodium hydroxide and the liberated base extracted with ether. The ether extract is dried over anhydrous magnesium sulfate, concentrated and distilled to give 30.2 g. of 2-(2-piperidinoethoxy)ethanol, B.P. 93–94° (0.5 mm.).

11,12-Dihydro-6H-Dibenzo[b,f][1,4]Thiazocine-12-Carboxylic Acid, Ester With 2-(2-Piperidinoethoxy)Ethanol To 2.4 g. of 50% sodium hydride in mineral oil suspended in 50 ml. of dry toluene, are added 8.8 g. of 2-(2-piperidinoethoxy)ethanol in 25 ml. of toluene followed by 9.8 g. of 11,12-dihydro-6H-dibenzo[b,f][1,4]thiazocine-12-carbonyl chloride in 75 ml. of toluene. The mixture is refluxed for 1 hour, cooled, filtered and extracted with 250 ml. of dilute hydrochloric acid. The extract is then made basic with potassium carbonate and extracted with ether. Concentration of the ether extract affords 10.1 g. of a viscous oil, which on trituration in diisopropyl ether, crystallizes. Recrystallization from ligroin gives 4.3 g. of product, M.P. 69–71°.

EXAMPLE 2

4-Dimethylaminobutyl-2'-Tetrahydropyranyl Ether

A mixture of 19.2 g. of 4-chlorobutyl 2'-tetrahydropyranyl ether, 18.0 g. of anhydrous dimethylamine, and 25 ml. of toluene is heated at 94° for 24 hours. After cooling, the reaction mixture is filtered. The filtrate is concentrated and the residue distilled to give 50.0 g. of 4-dimethylaminobutyl-2'-tetrahydropyranyl ether, B.P. 90–92° (2 mm.), $n_D^{25}$ 1.4498.

4-Dimethylaminobutanol

A solution of 48.3 g. of 4-dimethylaminobutyl 2'-tetrahydropyranyl ether in a mixture of 200 ml. of 70% ethyl alcohol and 33 ml. of concentrated hydrochloric acid is heated under reflux for 1 hour, concentrated to dryness, the residue made alkaline with 50% aqueous sodium hydroxide, and extracted with ether. The ether is evaporated and the residue distilled to give 15.7 g. of product, B.P. 75–77° (10 mm.), $n_D^{24}$ 1.4391.

11,12-Dihydro-6H-Dibenzo[b,f][1,4]Thiazocine-12-Carboxylic Acid, Ester With 4-Dimethylaminobutanol The reaction of 11,12-dihydro-6H-dibenzo[b,f][1,4]-thiazocine-12-carbonyl chloride, 10.1 g., 5.2 g. of 4-dimethylaminobutanol and 2.5 g. of 50% sodium hydride dispersion in mineral oil, as described in Example 1, gives 4.2 g. of 11,12-dihydro-6H-dibenzo[b,f][1,4]thiazocine-12-carboxylic acid, ester with 4-dimethylaminobutanol.

11,12-Dihydro-6H-Dibenzo[b,f][1,4]Thiazocine-12-Carboxylic Acid, Ester With 4-Dimethylaminobutanol, Salt With One Mole of Oxalic Acid To 4.2 g. of the above base in 50 ml. of anhydrous ether is added 1.1 g. of oxalic acid in 10 ml. of acetone. The resulting precipitate is filtered and recrystallized from absolute ethanol to give 2.7 g. of product, M.P. 116–117°.

EXAMPLE 3

11,12-Dihydro-6H-Dibenzo[b,f][1,4]Thiazocine-12-Carboxylic Acid, Ester With 2-(1-Piperazino)Ethanol 8.7 g. of 11,12-dihydro-6H-dibenzo[b,f][1,4]thiazocine 12-carbonyl chloride and 3.9 g. of 2-(1-piperazino)ethanol and 5.2 g. of a 50% dispersion of sodium hydride in mineral oil are reacted as in Example 1, to obtain 8.0 g. of product.

11,12-Dihydro-6H-Dibenzo[b,f][1,4]Thiazocine-12-Carboxylic Acid, Ester With 1,4-Piperazinodiethanol A solution of 8.0 g. of the above piperazine derivative in 250 ml. of methanol containing 2.8 g. of ethylene oxide is heated under reflux for 2 hours, concentrated in vacuo, 250 ml. of dry benzene are added and the resulting solution again concentrated to dryness. The residual 11,12-dihydro - 6H - dibenzo[b,f][1,4]thiazocine-12-carboxylic acid, ester with 1,4-piperazinodiethanol weighs 7.6 g., M.P. 97–9°.

11,12-Dihydro-6H-Dibenzo[b,f][1,4]Thiazocine-12-Carboxylic Acid, Ester With 1,4-Piperazinodiethanol, Salt With 2 Moles of Oxalic Acid To 7.6 g. of the above base in 50 ml. of acetonitrile are added 3.6 g. of oxalic acid in acetonitrile. The solid which separates is then recrystallized from 80% ethanol to give 4.6 g. of product, M.P. 185–186° (dec.).

EXAMPLE 4

2 - (Trifluoromethyl) - 11,12-Dihydro-6H-dibenzo[b,f][1,4]Thiazocine-12-Carboxylic Acid, Ester With 3-Aminopropanol By substituting 38.6 g. of 4-(trifluoromethyl)-o-aminobenzenethiol for the o-aminobenzenethiol in Example 1, there are obtained 23.5 g. of 2-(trifluoromethyl)-11,12-dihydro-6H-dibenzo[b,f][1,4]thiazocine.

A mixture of 2.95 g. of 2-(trifluoromethyl)-11,12-dihydro-6H-dibenzo[b,f][1,4]thiazocine and 2.0 g. of phosgene in 100 ml. of toluene are heated under reflux for two hours and concentrated to half-volume in vacuo. This cooled solution of 2-(trifluoromethyl)-11,12-dihydro-6H-dibenzo[b,f][1,4]thiazocine-12-carbonyl chloride is then added to 0.8 g. of 50% sodium hydride in mineral oil and 1.5 g. of 3-aminopropanol in 50 ml. of toluene prepared as in Example 1. The mixture is then refluxed for 1 hr. and treated as in Example 1 to give 2-(trifluoromethyl) - 11,12-dihydro-6H-dibenzo[b,f][1,4]thiazocine-12-carboxylic acid, ester with 3-aminopropanol.

EXAMPLE 5

2-Methoxy-11,12 - Dihydro - 6H-Dibenzo[b,f][1,4]Thiazocine-12-Carboxylic Acid, Ester With 1-Piperidylmethanol. 2-Amino-p-Anisyl Sulfonic Acid, Sodium Salt To a solution of 123.2 gms. of m-anisidine in one liter of tetrachloroethane are added 128 gms. of chlorosulfonic acid and the mixture is stirred at 150° for one hour. The reaction mixture is cooled, the solid filtered, air dried and dissolved in 1 l. of hot N-sodium hydroxide. The hot solution is filtered and cooled to give 180 gms. of the sodium salt.

2-Amino-p-Anisyl-Sulfonyl Chloride

To 225.2 gms. of 2-amino p-anisyl sulfonic acid, sodium salt, and 10 ml. of dimethylformamide are added 250 ml. of thionyl chloride. The mixture is heated at 90° for 0.5 hr. and concentrated in vacuo. To the residue are added 100 ml. of dry benzene and the mixture is again concentrated in vacuo. The product is purified by dissolving the residue in 100 ml. of ether and washing the ether solution with a saturated solution of sodium bicarbonate. After drying and removal of the ether there are obtain 177 gms. of 2-amino-p-anisylsulfonyl chloride. To 305 ml. of concentrated sulfuric acid and 2 kg. of finely cracked ice kept at −5° to 0° are added 180 gms. of 2-amino-p-anisylsulfonyl chloride followed by 280 gms. of zinc dust, added in small portions. The reaction mixture is stirred for one hour and heated under reflux for 8 hours. After cooling, the mixture is neutralized and steam distilled. The distillate is extracted with ether, the extract dried, concentrated and distilled to give 95 gms. of 2-amino-p-anisylthiol.

2-Methoxy-11-Dihydro-6H-Dibenzo[b,f][1,4]Thiazocine

By substituting 31 gms. of 2-amino-p-anisylthiol for the o-aminobenzene thiol in Example 1, there is obtained 2-methoxy-11,12 - dihydro - 6H-dibenzo[b,f][1,4]thiazocine.

A solution of 5.14 g. of 2-methoxy-11,12-dihydro-6H-dibenzo[b,f][1,4]thiazocine, 2.17 g. of ethyl chlorocarbonate and 100 ml. of dry xylene are heated under reflux for 2 hours and then concentrated to one-half volume in vacuo. To this xylene solution of 2-methoxy-11,12-dihydro - 6H-dibenzo[b,f][1,4]thiazocine-12 - carboxylic acid, ester with ethyl alcohol, is added 5.8 g. of 1-piperidylmethanol and 0.1 g. of sodium methoxide. The mixture is heated so as to distill the ethanol as formed. When no more ethanol distills, the mixture is concentrated to dryness and the residue treated as in Example 1 to give 2-methoxy-11,12-dihydro-6H-dibenzo[b,f][1,4]thiazocine-12-carboxylic acid, ester with 1-piperidylmethanol, as an oil. This oil, 2.0 g., in 25 ml. of dry ether is treated with 0.19 g. of hydrogen chloride in dry ether to give the crystalline hydrochloride.

EXAMPLE 6

*2-Chloro-11,12 - Dihydro - 6H - Dibenzo[b,f,][1,4]Thiazocine-12-Carboxylic Acid, Ester With 1-Pyrrolidylethanol*

By substituting 32.0 g. of 4-chloro-o-aminobenzenethiol for the 26.5 g. of o-aminobenzenethiol in Example 1, there is obtained 2-chloro-11,12-dihydro-6H-dibenzo[b,f][1,4]thiazocine.

By substituting 5.23 g. of 2-chloro-11,12-dihydro-6H-dibenzo[b,f][1,4]thiazocine for the 5.14 g. of 2-methoxy-11,12-dihydro-6H-dibenzo[b,f][1,4]thiazocine and 5.8 g. of 1-pyrrolidylethanol for the 5.8 g. of 1-piperidylmethanol in the procedure of Example 5, there is obtained 2-chloro-11,12-dihydro - 6H-dibenzo[b,f][1,4]thiazocine-12-carboxylic acid, ester with 1-pyrrolidylethanol.

EXAMPLE 7

*2-Methyl-11,12-Dihydro - 6H - Dibenzo[b,f][1,4]Thiazocine-12-Carboxylic Acid, Ester With 2-Methylaminoethanol*

By substituting 28.0 g. of 2-amino-p-toluenethiol for the o-amino-benzenethiol in the procedure of Example 1, there is obtained 2-methyl-11,12-dihydro-6H-dibenzo[b,f][1,4]thiazocine.

By the procedure of Example 4, but employing 2.41 g. of 2-methyl-11,12-dihydro-6H-dibenzo[b,f][1,4]thiazocine in place of the 2-(trifluoromethyl)derivative, and 1.5 g. of 2-methylaminoethanol in place of the 3-amino-propanol, there is obtained 2-methyl-11,12-dihydro-6H-dibenzo[b,f][1,4]thiazocine-12-carboxylic acid, ester with 2-methylaminoethanol.

EXAMPLE 8

*N-(3-Dimethylaminopropyl) - 11,12 - Dihydro-6H-Dibenzo[b,f][1,4]Thiazocine-12-Carboxamide*

A mixture of 5.8 g. of 11,12-dihydro-6H-dibenzo[b,f][1,4]thiazocine-12-carbonyl chloride, 150 ml. of dry xylene, 4.1 g. of 3-dimethylaminopropylamine and 1.0 g. of the 50% dispersion of sodium hydride in mineral oil was reacted as in Example 1 to give 3.5 g. of N-(3-dimethylaminopropyl)-11,12 - dihydro-6H - dibenzo[b,f][1,4]thiazocine-12-carboxamide, M.P. 121–122°.

This invention may be variously otherwise embodied within the scope of the appended claims.

What is claimed is:

1. A compound selected from the group consisting of bases of the formula

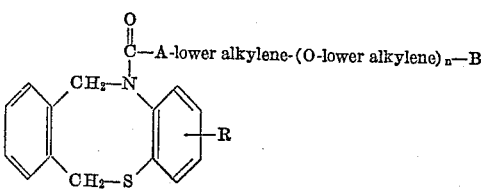

wherein R represents a member of the group consisting of hydrogen, halogen, trihalomethyl, trihalomethylmercapto, lower alkoxy and lower alkyl, A represents a member of the group consisting of O, NH and N-lower alkyl, B represents a member of the group consisting of amino, di-lower alkylamino, di(hydroxy-lower alkyl amino and basic saturated 5- to 6-membered nitrogen heterocyclic radical of less than 12 carbon atoms selected from the group consisting of piperidyl, (lower alkyl) piperidyl, di(lower alkyl)piperidyl, (lower alkoxy)piperidyl, pyrrolidyl, (lower alkyl)pyrrolidyl, di(lower alkyl) pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl) thiamorpholinyl, di(lower alkyl)thiamorpholinyl, (lower alkoxy)thiamorpholinyl, piperanzinyl, (lower alkyl)piperazinyl, di(lower alkyl)piperazinyl, (lower alkoxy) piperazinyl, (hydroxy-lower alkyl)piperazinyl, (lower alkanoyloxy-lower alkyl)piperazinyl, (hydroxy-lower alkoxy-lower alkyl)piperazinyl and (carbo-lower alkoxy) piperazinyl, and $n$ represents an integer from 0 to 1, and pharmaceutically acceptable acid addition salts thereof.

2. 12-di(lower alkyl)amino-lower alkyl esters of 11,12-dihydro-6H-dibenzo[b,f][1,4]thiazocine - 12 - carboxylic acid.

3. 11,12-dihydro-6H - dibenzo[b,f][1,4]thiazocine-12-carboxylic acid, ester with 4-dimethylaminobutanol.

4. 11,12-dihydro-6H - dibenzo[b,f][1,4]thiazocine-12-carboxylic acid, ester with 2-(1-piperazino)ethanol.

5. 11,12-dihydro-6H - dibenzo[b,f][1,4]thiazocine-12-carboxylic acid, ester with 2-(2-piperidinoethoxy)ethanol.

6. N-(3-dimethylaminopropyl)-11,12 - dihydro-6H-dibenzo[b,f][1,4]thiazocine-12-carboxamide.

7. A compound of the formula

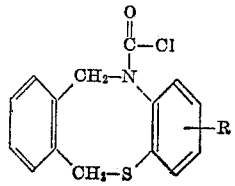

wherein R represents a member of the group consisting of hydrogen, halogen, trihalomethyl, trihalomethylmercapto, lower alkoxy and lower alkyl.

8. 11,12-dihydro-6H - dibenzo[b,f][1,4]thiazocine-12-carbonyl chloride.

9. 2-(trifluoromethyl)11,12-dihydro-6H - dibenzo[b,f][1,4]thiazocine-12-carbonylchloride.

References Cited in the file of this patent

FOREIGN PATENTS

| | | |
|---|---|---|
| 208,870 | Austria | May 10, 1960 |
| 537,946 | Belgium | May 31, 1955 |